(12) United States Patent
Levin et al.

(10) Patent No.: US 7,577,861 B2
(45) Date of Patent: Aug. 18, 2009

(54) DUTY CYCLE REJECTING SERIALIZING MULTIPLEXER FOR OUTPUT DATA DRIVERS

(75) Inventors: Alexander Levin, Port Orchard, WA (US); Sriram Badrinarayanan, Folsom, CA (US); Chris D. Matthews, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 381 days.

(21) Appl. No.: 11/322,681

(22) Filed: Dec. 30, 2005

(65) Prior Publication Data
US 2007/0157048 A1     Jul. 5, 2007

(51) Int. Cl.
*G06F 13/42* (2006.01)
*G06F 1/00* (2006.01)
*G06F 1/12* (2006.01)

(52) U.S. Cl. .................. 713/400; 713/500; 713/600
(58) Field of Classification Search .................. 713/400
See application file for complete search history.

(56) References Cited

U.S. PATENT DOCUMENTS

| | | | |
|---|---|---|---|
| 6,043,682 A | 3/2000 | Dabral et al. | |
| 6,819,145 B2 | 11/2004 | Swartz et al. | |
| 6,937,173 B2 * | 8/2005 | Kim | 341/101 |
| 7,133,484 B2 * | 11/2006 | Lin | 375/373 |
| 7,243,173 B2 * | 7/2007 | Campbell | 710/71 |
| 2005/0212561 A1 | 9/2005 | Levin | |

* cited by examiner

*Primary Examiner*—Thomas Lee
*Assistant Examiner*—Stefan Stoynov
(74) *Attorney, Agent, or Firm*—David P. McAbee

(57) ABSTRACT

A method and apparatus is described herein for serializing input data streams into an output data stream. A first and second input data stream are sampled upon rising edges of a first and second clocking signal, respectively, to reduce jitter from dependence on the falling edges of the clocking signals. The second clocking signal is 180 degrees out of phase with the first clocking signal to sample the first input data stream in the first unit interval of an output data stream and the second input data stream in the second unit interval of the output data stream. Consequently, a serialized output data stream is driven at twice the frequency of both the first and the second input data streams, including logical information from the first and second input data streams every period of the output data stream.

30 Claims, 6 Drawing Sheets

DUTY CYCLE REJECTING SERIALIZING MULTIPLEXER FOR OUTPUT DATA DRIVERS

FIELD

This invention relates to the field of computer systems, and in particular, to reducing output jitter in merged data streams.

BACKGROUND

As computers advance, integration of platforms and their components become a larger and more complex task. As devices within computers continue to evolve, the speed at which the devices internally run increases. To this end, interconnects between devices become a limiting performance factor, if the speed at which interconnects transmit data is not increased. Previously, interconnects at much slower speeds were more concerned with the digital design of the output buffer, as compared to the integrity of signals transmitted.

However, as speeds of transmitted signals on interconnects have progressed from MHz to GHz, the need for better signal integrity has become essential. As the frequency of transmitted signals continue to increase, timing and signal integrity become important in ensuring that valid and correct data is transmitted. Yet, as the transmission speed of data has increased, the speed at which data must be processed and output onto interconnects has also increased.

As a consequence, data pre-processing activities have been split into lower speed parallel path in order to efficiently execute complex logical and arithmetic operations. For example, computation equalization of an output data stream may be difficult at a full output rate. However, by splitting operations into the parallel paths the eventual merger of the data stream in a differential driver will quickly consume any allowable output jitter budget due to systematic imperfection in the output data time alignment.

BRIEF DESCRIPTION OF THE DRAWINGS

The present invention is illustrated by way of example and not intended to be limited by the figures of the accompanying drawings.

FIG. 3b illustrates an embodiment of the inverter shown in FIG. 3a.

DETAILED DESCRIPTION

In the following description, numerous specific details are set forth such as specific logic transitions, logic gates, and circuit implementations in order to provide a thorough understanding of the present invention. It will be apparent, however, to one skilled in the art that these specific details need not be employed to practice the present invention. In other instances, well known components or methods, such as output buffer design, pulse generation, phase-locked loop design, etc., have not been described in detail in order to avoid unnecessarily obscuring the present invention.

Logic Levels

Figure 1:
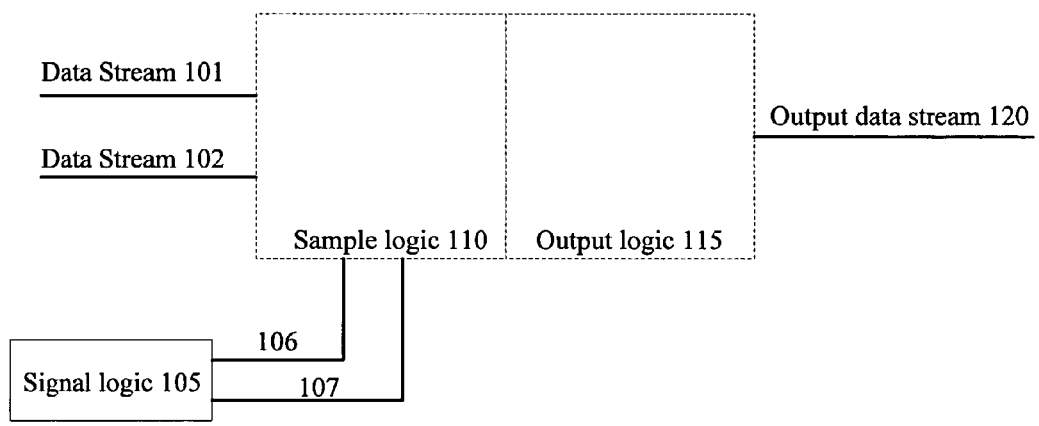
FIG. 1 illustrates an embodiment of a multiplexer for serializing input data streams into an output data stream.

FIG. 1 illustrates an embodiment of a multiplexer for outputting a serialized data stream from a plurality of input data streams. Data stream 101 and 102 are comprised of binary or logical information/data. In one embodiment, data stream 101 and 102 include signals having multiple logic levels. Often, these logic levels are referred to as 1's and 0's, which simply represents binary logic states. For example, a 1 refers to a high logic level and 0 refers to a low logic level. In many older systems a high voltage level was represented by a voltage, e.g. 5V, and a low voltage level, e.g. 0V. As another specific example, a high logic level is at 1.2V and a low logic level is at 0.3V. However, a high logic level may refer to any logic level above a threshold value, and inversely, a low logic level may refer to any logic level below the threshold value. In addition, there may be more than two logical levels in a waveform. As an example, a single waveform may represent four different logical values at different voltage levels.

Transitions

When a wave or pulse shifts between logic levels, it is commonly referred to as a transition. For example, a shift in a pulse from a high logic level to a low logic level is typically denoted a falling edge transition, as the wave is "falling" from a high logic level to a low logic level. Alternatively, when changing from a low logic level to a high logic level, that transition is commonly referred to as a rising edge transition or rising direction.

Period and Unit Intervals

Figure 2:
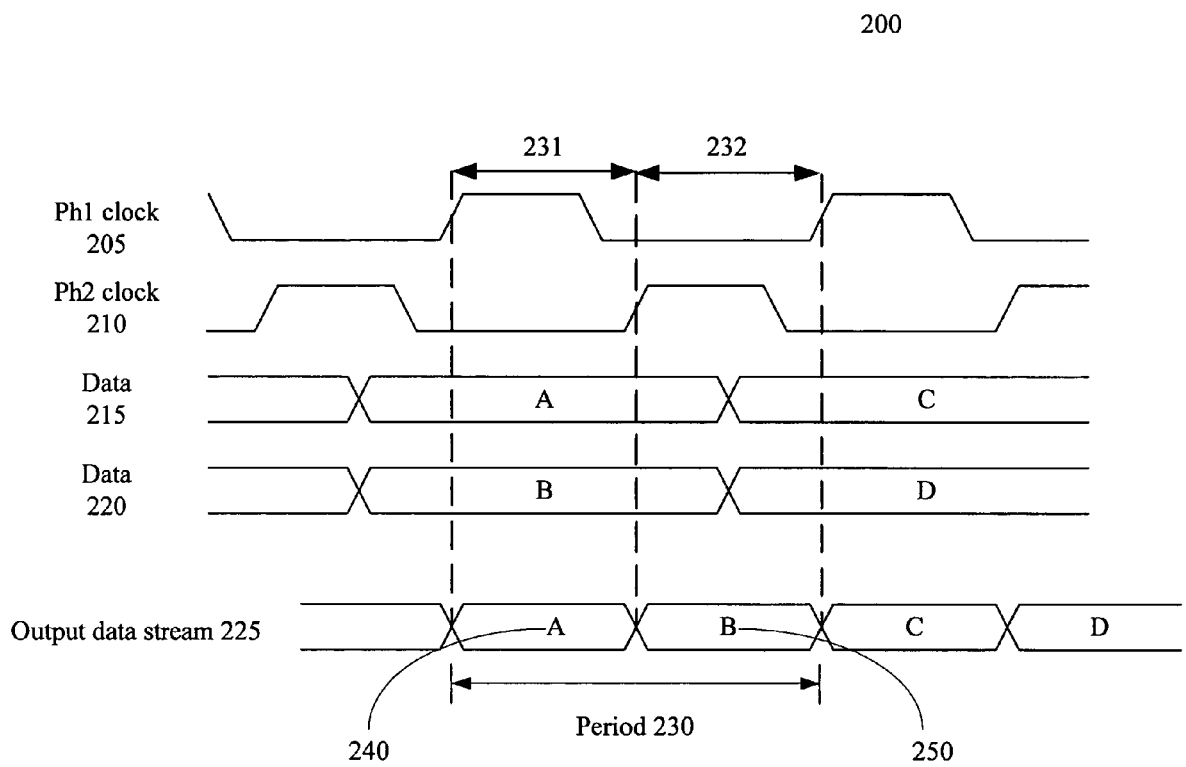
FIG. 2 illustrates an embodiment of a timing diagram for sampling two data streams with two clock signals and outputting a serialized data stream.

Referring to FIG. 2, a timing diagram 200 of a simplified logical representation of two data streams merging is illustrated. First data stream 215 and second data stream 220 transition at a first frequency. As discussed below, first data stream 215 and second data stream 220 may be generated from any number of processing operations. In one embodiment the first and second data streams 215 and 220 are parallel streams split to accommodate complex logic functions or clock speed limitations. As illustrated, first and second data stream 215 and 220 are serialized or merged into data output stream 225.

A period is often referred to as the time a wave takes to complete a full oscillation, the time between like transitions, i.e. the same polarity transitions, or the time between like repeating characteristics. Here, period 230 of output data stream 225 is broken into two unit intervals, first unit interval 231 and second unit interval 232, which includes the first half of period 230 and second half of period 230, respectively. Periodic for a wave or waveform refers to the fact that the wave or waveform repeats in successive periods.

Serialization of Data Streams

In timing diagram 200, two clocks, phase one clock 205 and phase two clock 210 are shown. Phase two clock 210 is out of phase from phase one clock 205. In one embodiment, phase two clock 210 is 180 degrees out of phase with phase one clock 205. Consequently, a rising edge of either phase one clock 205 or phase two clock 210 occurs every unit interval. As discussed below, phase one clock 205 and phase two clock 210 may be generated from the same logic to ensure that they are 180 degrees out of phase.

Upon a transition of phase one clock 205 in a first direction, first data stream 215 is sampled. Upon a transition of phase two clock 210 in the first direction, second data stream 220 is sampled. In the embodiment illustrated in FIG. 2, data stream 215 is sampled based on a rising edge of phase one clock 205 and data stream 220 is sampled on a rising edge of phase two clock 210. As can be seen, output data stream 225 includes representative logic levels A in unit interval 231 from first data stream 215 and B in unit interval 232 from second data stream 220. Extending the example further, future unit intervals would alternate including the logical information from data 215 in one unit interval and the logical information from data 220 in the next unit interval.

Where the sampling is dependent on the rising edge, the duty cycle of clock 205 and 210 are generated to have a less than 50% duty cycle. As discussed below, overlapping high logic levels may result in contention within the multiplexer. As one example, clocks 205 and 210 are skewed along the clock tree path using a stronger pull-down, or inversely a stronger pull-up device, to ensure the correct duty cycle. FIG. 2 illustrates this example, where low logic levels of phase 1 clock 205 may overlap with phase two clock 210; yet, high logic levels do not overlap to evade potential conflicts in serializing data stream 215 and 220.

Also shown in FIG. 2 is output data stream 225, which is output at twice the frequency of data 215 and data 220. As a consequence, the logic functions or operations performed to generate data 215 and data 220 are performed at half the output frequency. However by sampling data 215 and data 220 every other unit interval, data 215 and data 220 are merged/serialized into a single data output stream 225. Furthermore, by sampling using two clock signals out of phase with each other, the output jitter is reduced as there is no dependency on the falling edge of either clock signal.

Signal/Clocking Logic

Referring back to FIG. 1, signal logic 105 is shown. Signal logic 105 may be any logic for providing sampling/clocking signals to sample logic 110. In the embodiment illustrated in FIG. 2, signal logic 105 provides phase one clock 205 and phase two clock 210. As a first example, sample logic 105 is locked loop logic that generates clocking signals. Specifically, sample logic 105 is a phase locked loop (PLL) circuit/logic to generate a plurality of clock signals.

A PLL often includes multiple circuit elements in a ring formation to generate a clocking signal. Often PLL designers are able to place one edge, being a rising edge or a falling edge, of a clocking signal consistently a full-period apart without huge variation, also referred to as jitter. Yet, jitter is typically introduced in the placement of both rising and falling edges between periods. Consequently, using both the rising edge and falling edge of one clocking signal to merge data streams may introduce large amounts of jitter into an output data stream. As a result, multiple clocking signals may be generated, while only the rising or only the falling edges of those signals are used to merge data. By using the same polarity edge, the jitter introduced from the sampling of input data streams by multiple clocking signals is compensated for.

In one embodiment, a PLL generates a first clock signal from a first stage of the PLL and a second clock signal from a second stage of the PLL. The first and second stages may be any stages of the PLL that result in different phases between the first and second clock signal. For example, the first clock signal is generated from a first stage of the PLL and the second clock signal is generated from a second stage of the PLL to be 180 degrees out of phase with the first clock signal. The first and second clock signals being 180 degrees out of phase from a single direction edge between periods is also referred to as the first and second clock signals being complimentary in phase.

Therefore, although duty cycles of the clocking signals may vary, the placement of a single direction edge from period to period remains 180 degrees out of phase with small amounts of variation. Although the two clocking signals may be individually generated by separate PLL circuits, placing a rising edge of each clocking signal 180 degrees apart becomes difficult, since the inherent differences in the PLL circuits themselves introduce jitter. By generating both clock signals from different stages of the same PLL, the phase difference between the rising edges of both clocking signals remains much more constant, as the same variations of the single PLL circuit are introduced into both clocking signals.

Sampling Logic

Sampling logic 110 includes any logic for sampling a plurality of data streams based on transitions of clocking signals provided by signal logic 105. As an example, sample logic 110 samples data stream 101 upon a transition of clocking signal 106 in a first direction and samples data stream 102 upon a transition of clocking signal 107 in the first direction. The first direction may be selected from either a rising direction or a falling direction. In FIG. 2 where a rising edge is used, a first data signal 215 is sampled by sampling logic upon a rising edge of phase 1 clock 205, while data 220 is sampled by sampling logic upon a rising edge of phase 2 clock 210. Specific embodiments of sampling logic 110 are discussed below in reference to FIG. 3a.

Output Logic

Output logic 115 includes any logic for outputting a serialized data stream, such as data stream 120, from a plurality of input data streams, such as data streams 101 and 102. In one embodiment, output logic 115 is a differential pre-driver, which provides a differential output data stream 120 to a differential driver. In an alternate embodiment, output logic 115 is a driver for driving output data stream 120 across an interconnect. A specific embodiment for implementing output logic 115 is discussed in reference to FIG. 3a.

An Embodiment of a Multiplexer to Output a Serialized Data Stream

Figure 3A:
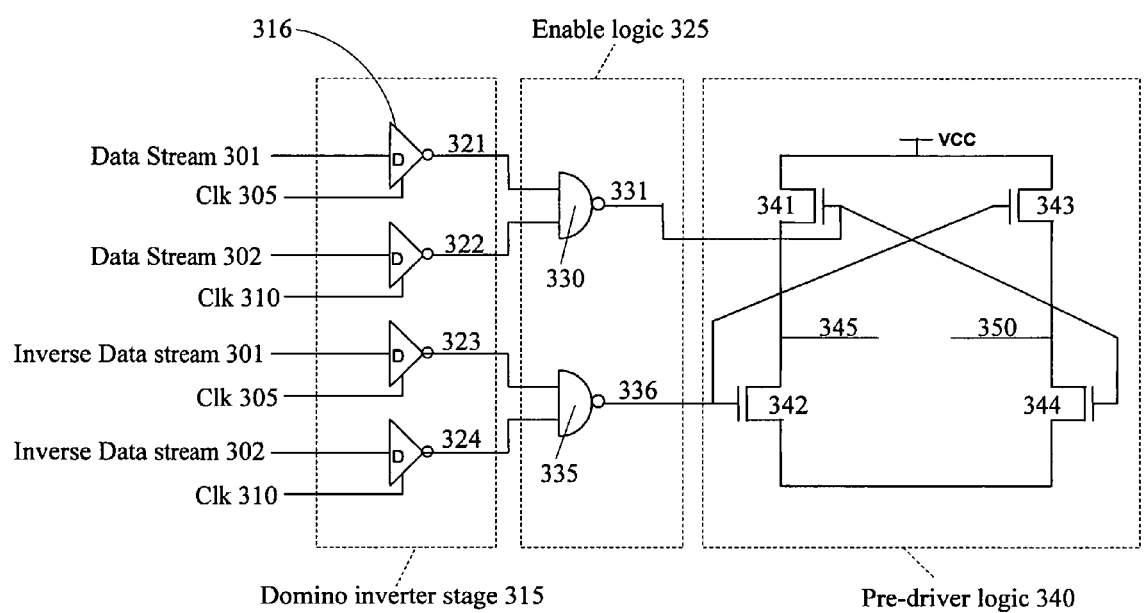
FIG. 3a illustrates another embodiment of a multiplexer for serializing input data streams into an output data stream.

Referring to FIG. 3a, an illustrative embodiment of a multiplexer to output a serialized data stream is shown. Two input data streams, data stream 301 and data stream 302, are taken as inputs, while a differential output data stream is provided on outputs 345 and 350. Domino inverter stage 315 takes in data stream 301, an inverse of data stream 301, data stream 302, and an inverse of data stream 302 as inputs, as well as clock 305 and clock 310. Based on the inputs and clock signals, domino inverter stage 315 outputs set/reset signals 321-324. As shown, domino inverter stage 315 includes four inverters, such as inverter 316.

Figure 3B:
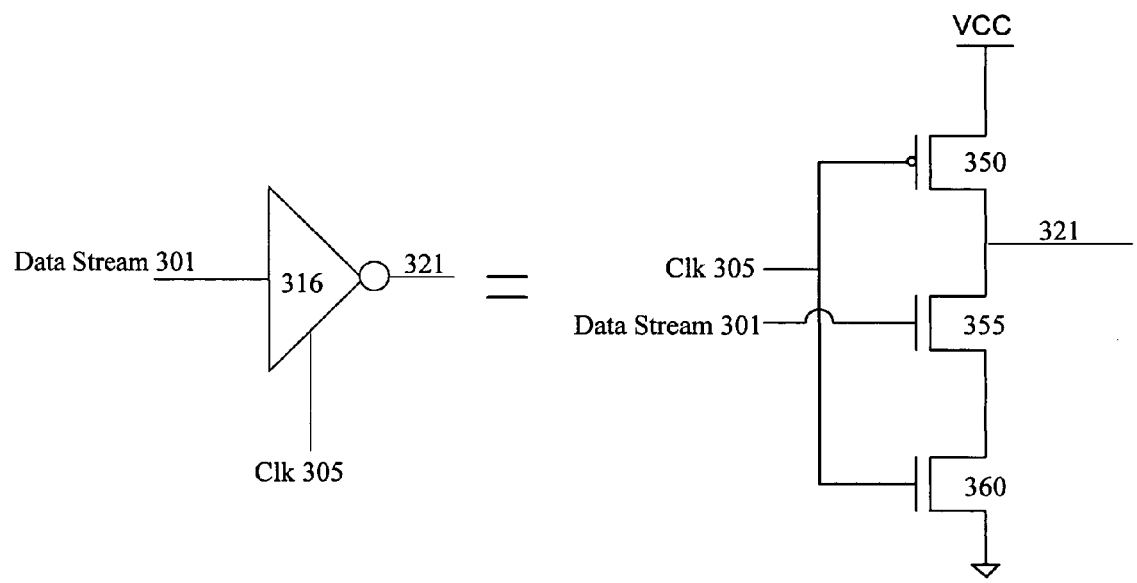

Turning briefly to FIG. 3b, an embodiment of inverter 316 is shown. Clock 305 is coupled to the gates of PMOS transistor 350 and NMOS transistor 360, while data stream 301 is coupled to the gate of NMOS transistor 355. As stated above, data input streams may be sampled based on a transition of a clock signal, such as clock 305 in a first direction, which may be a rising direction. As a specific example, inverter 316, outputs a high to low transition on output 321, when clock 305 has a rising edge transition, and data stream 301 has a high value. Inverter 316 maintains a high output throughout the cycle of clock 305 when data stream 301 has a low logic value.

To illustrate, assume that data stream 301 has a high logic value, i.e. a 1. Upon a transition of clock 305 from a 0 to a 1, PMOS transistor 350 turns off and NMOS transistor 360 turns on. With data stream 301 having a 1 logic value, transistor 355 is also turned on, pulling set signal 321 down to a low logic value. In contrast, if clock signal 305 is falling, then transistor 350 turns on and transistor 360 turns off, leaving output 321 in a pre-charge state. Although, set signal 321 may transition low to high in the example above, the later stages of the multiplexer shown in FIG. 3a are designed to only respond to the high to low, or falling, transition from the outputs of the inverters, such as inverter 316. For this reason, a data stream, such as data stream 301, is only sampled on the rising edge of a corresponding clock signal, such as clock signal 305.

Back to FIG. 3a, enable logic 325 takes set/reset signals 321-324 as inputs and provides enable signals to pull-up and pull-down logic of pre-driver 340. As illustrated, set/reset signals 321 and 322 are taken as inputs to NAND gate 330. NAND gate 330 drives a 0 to 1 transition on output 331, when a falling edge, or 1 to 0 transition occurs on one of its inputs. Above, it was noted that the inverters in stage 315 provide a falling edge transition upon a rising edge of the input clock. Therefore, enable logic 325 illustrates the further dependence on a rising edge transition of the clock signals.

Pre-driver logic 340, as illustrated, is a NMOS pre-driver. Therefore, the pre-driver responds to a 0 to 1 transition on its inputs 331 and 336. For example, when the inverters, such as inverter 316 enters a precharge state (a logical 1) during a falling edge on clock 305, NAND gate 330 may output a 1 to 0 transition as a result. However, there is no reaction from the following NMOS pre-driver circuitry. Since pre-driver logic 340 includes NMOS transistors 341-344, output nodes 345 and 350 will only transition or change state when pull-up logic 341 or 343, as well as pull-down logic 342 or 344 are actually turned on, not turned off. Continuing the example from above, the transition of NAND gate 330 from a 1 to a 0 merely turns pull-up logic 341 and pull-down logic 344 off, which does not affect the outputs 345 or 350.

As a consequence, the output state of the output data stream is only changed when inputs 331 or 336 are at a high logic value and enable at least one of transistors 341-344. However, enable signals 331 and 336 are at a high logic level when a set/reset signal is low, which has the potential of occurring only on a rising edge of clocks 305 and 310.

As another brief walk through example to illustrate the operation of logic in FIG. 3a, assume data stream 301 has a high logic value of 1. A rising edge of clock 305 drives a 1 to 0 transition on set signal 321, by operation of inverter 316. NAND gate 330 responds to that transition by driving enable signal 331 to a 1, which turns on pull-up logic 341 of output 345 and pull-down logic 344 of output 350. Therefore, a differential output data stream is output having a first output 345 with a high logic value and a second differential output 350 with a low logic value based on the sample of data stream 301 during a rising edge of clock 305.

Now, when the negative edge of clock 305 arrives, set signal 321 will drive to a 1. Depending on the value of set signal 322, enable signal 331 may be driven to a 0 by NAND gate 330. Driving enable signal 331 to a 0 turns-off pull-up logic 341 and pull-down logic 344. However, only turning off the NMOS device will not actively change the voltage on the output data stream, i.e. outputs 345 and 350.

In FIGS. 3a and 3b, the logic illustrated was dependent on rising edges of clocks 305 and 310; however, serializing data is not so limited. In fact, pre-driver logic 340 may include only NMOS devices as shown, only PMOS devices, or a combination thereof. In a PMOS configuration, enable logic 325 and domino inverter stage 315 may be altered, so the logic is dependent on falling/negative edges of clocks 305 and 310. In this example, in the domino inverter stage 315 the PMOS and NMOS devices are switched in position in the circuits.

Although the upper path of the logic in FIG. 3a was discussed in detail to explain the operation of the logic without unnecessarily obscuring the discussion through repetition, the remaining portion of the logic and circuitry illustrated, but not specifically discussed, in FIG. 3a, operates in a similar manner.

An Embodiment of a System to Drive Serialized Data

Figure 4:
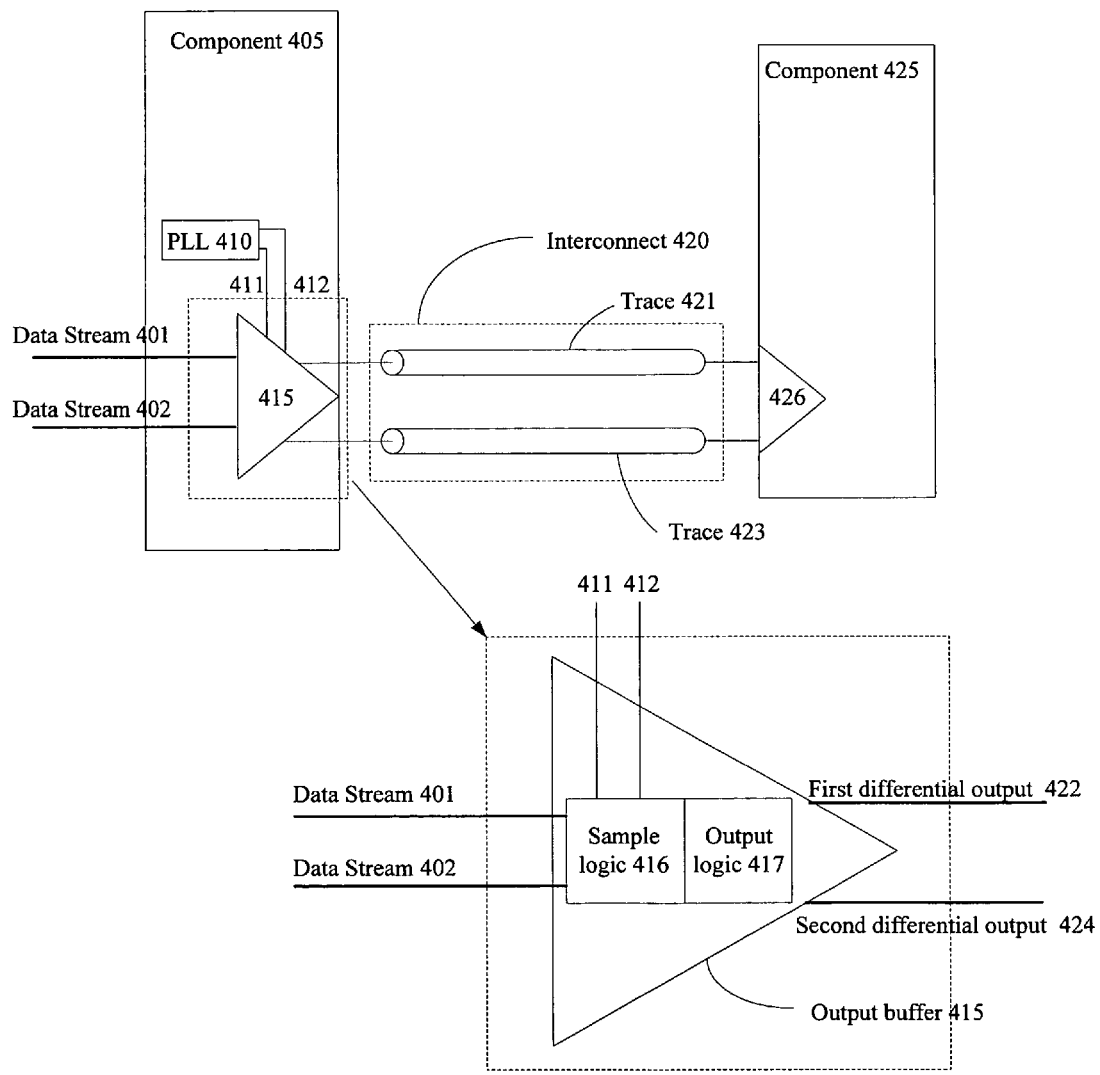
FIG. 4 illustrates an embodiment of a system including a component to serialize input data streams into an output data stream to be transmitted over an interconnect to another component.

Referring next to FIG. 4, an embodiment of a system to drive serialized data between two components coupled through an interconnect is illustrated. Component 405 and component 425 are shown coupled through interconnect 420. Component 405 and component 425 may each be any component in a computer system. Examples of component 405 and 425 include a microcontroller, processor, a microprocessor, a controller hub, a memory controller hub, a interconnect controller hub, a video controller, a memory device, an interconnect device, a network adapter, and an audio controller.

As a specific example, component 405 is a microprocessor and component 425 is a memory controller hub. Another configuration includes component 425 as a interconnect controller hub (ICH) and component 405 as an add-in common-serial interconnect (CSI) device.

Interconnect 420 may also be any interconnect for coupling components together. In one embodiment, interconnect 420 is a differential interconnect. In this embodiment, an output data stream includes first differential output 422 driven on trace 421 and second differential output 424 driven on trace 423. Other examples of interconnect 420 are a common serial interconnect (CSI), a front-side bus (FSB), a peripheral bus, a video interconnect, and a controller hub link interconnect.

Also shown are buffer 415 in component 405 and buffer 426 in component 425. Buffer 415 includes sample logic 416 and output logic 117. Sample logic 416 and output logic 417 are discussed above in reference to FIGS. 1-3b. In this example, buffer 415 is illustrated as an output buffer for driving an output signal and buffer 426 is illustrated as an input buffer. However, buffer 415 and buffer 426 may each be an output buffer, an input buffer, or a bi-directional buffer for both transmitting and receiving data.

To illustrate a potential configuration, a specific illustrative embodiment includes component 405 as a microprocessor and component 425 as a controller hub. PLL 410 is located on microprocessor 405 to generate clocking signal 411 and clocking signal 412, which is 180 degrees out of phase with clocking signal 411, to be provided to buffer 415. Data stream 401 and data stream 402 are parallel data streams generated from operations on microprocessor 405 at a first frequency. Buffer 415 includes sample logic 416 and output logic 417, which is comprised of a domino inverter stage, enable logic, a NMOS differential pre-driver, and a differential driver for outputting a differential signal on common serial interface (CSI) 420.

Data stream 401 and 402 are sampled upon transitions of clocking signal 411 and 412 in a rising direction. Based on those samples, output logic 417 drives a serialized differential output signal onto CSI 420 at a second frequency, that is twice as fast as the first frequency. Buffer 426 on controller hub 425 receives the differential serialized signal at the second frequency. This configuration is discussed to show a potential configuration of a system; however, it should not be construed to limit configurations, which may include different components, different interconnects, different sample and output logic, as well as depend on falling edges instead of rising edges.

An Embodiment of a Method

Figure 5:
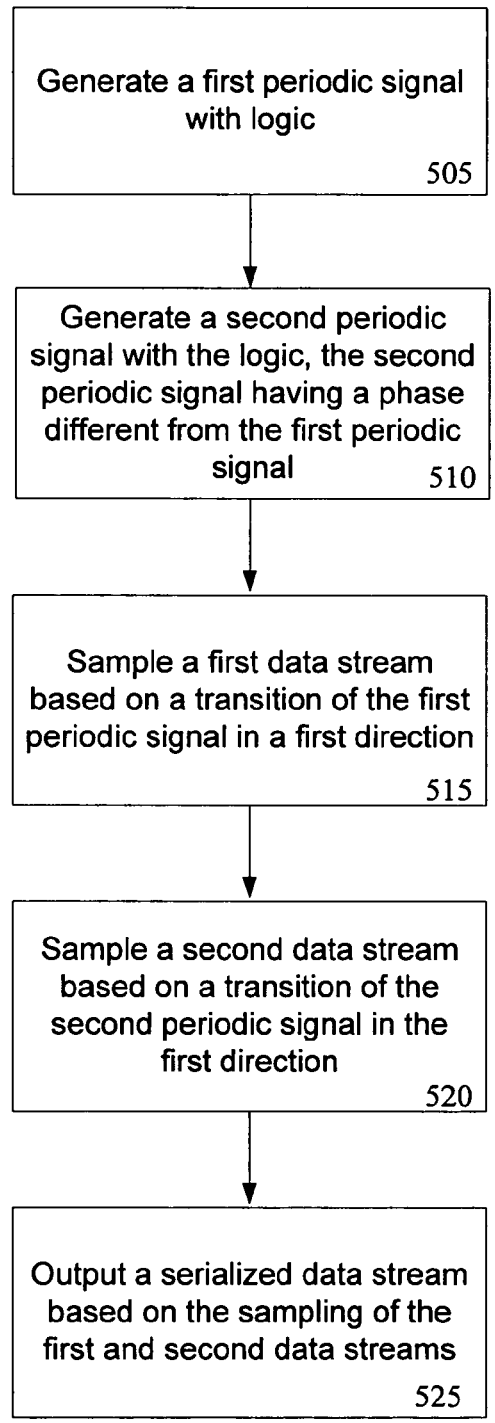
FIG. 5 illustrates an embodiment of a flow diagram for serializing a first and second data stream into an output data stream.

Turning to FIG. 5, a flow diagram for outputting a serialized data stream is illustrated. In flow 505, a first periodic signal is generated with logic. In flow 510, a second periodic signal is generated using the same logic, where the second periodic signal has a phase different from the first periodic signal. The first and second periodic signal may be clocking signals, timing signals, or any other waveform/signal that is periodic. In addition, the logic includes any logic for generating a periodic signal. As discussed above, the logic may include a crystal for generating a periodic signal, a ring formation, or a locked loop to generate the first and second periodic signals out of phase with each other. As an example, the logic is a phase locked loop to generate the first periodic signal from a first stage and the second periodic signal from a second stage.

As stated, the first and second periodic signals are out of phase. As an example, the phase difference between the signals is 180 degrees. As referenced above, it is potentially advantageous to sample parallel data from only the rising edges of the first and second periodic signals or the only the falling edges of the first and second periodic signals, based on the design of the logic. Typically, a single direction edge may be placed more consistently from period to period without large amounts of jitter than both a rising and falling edge exactly a half a period apart. In other words, at very high speeds a PLL often is unable to provide a clock output with a perfect 50% duty cycle. As a consequence, focusing on placement of one edge of multiple phase clocking signals allows for a more reliable sample every half of a period.

If sampling is dependent on the rising edges, then the duty cycle of the first and second periodic signals may be intentionally skewed below 50% to ensure that there are no overlapping rising edges. The intentional skewing of duty cycle potentially results in avoiding attempted samples of two different data streams at the same time. This embodiment is illustrated in FIG. 2, where the falling edge of phase one clock 205 occurs before the first half of period 230, i.e. unit interval 231, and where the falling edge of phase two clock 210 occurs before the end of period 230. Inversely, if the logic is dependent on a falling direction transition, then the duty cycle may be oppositely skewed to avoid contention.

Returning to FIG. 5, in flow 515 a first data stream is sampled, based on a transition of the first period signal in a first direction. In flow 520, a second data stream is sampled based on a transition of the second periodic signal in the first direction. As discussed above, the first direction may either be a rising or a falling direction. In one embodiment, sampling is done through a domino inverter stage as discussed in reference to FIGS. 3a and 3b.

Finally, in flow 525 a serialized data stream is output based on the sampling of the first and second data streams. In one embodiment, an output data stream is a single data stream output at a frequency faster than the first and second data stream. In another embodiment, an output data stream is a differential data stream output at a frequency faster than the first and second data stream. As noted above, an output data stream may transition at twice the frequency of both the first and second data stream; the output data stream having one unit interval for every period of the first and second data stream. Where the output data stream is transitioning at twice the frequency of the first and second data stream, the first unit interval of the output data stream may represent the logical information sampled from the first data stream and the second unit interval of the output data stream may represent the logical information sampled from the second data stream.

As a simplified example, assume that the first and second data streams are transitioning at a rate of 1.2 GHz, where the first data stream represents a logical 1 in its first period and the second data stream represents a logical 0 in its first period. Based on the sampling of the first and second data stream, a serialized data stream is output at 2.4 GHz. The serialized data stream may have a first differential output and a second differential output. As a consequence, in the first unit interval of the output data stream, the first differential output represents a logical 1 based on the sample of the first data stream and the second differential output represents a logical 0 being differential to the first output. In the second unit interval of the output data stream, the first differential output represents a logical 0 based on the sample of the second data stream and the second differential output represents a logical 1 being differential to the first output. Therefore, the output data stream includes the logical information from the first data stream and the logical information from the second data stream in one period of the output data stream.

As this example shows, not only may the complex pre-processing operations be split and slowed in frequency, but the clocking logic itself may also be slowed. Continuing the example above, instead of having a PLL have to produce a clocking signal of 2.4 GHz, the PLL generates two clocks at 1.2 GHz to output a signal at 2.4 GHz. As a result, the slower speeds enable better PLL designs, but do not compromise the frequency of the output data stream on an interconnect.

As the speed of interconnects increases to transmit data at higher rates, complex operations that may be performed more efficiently at lower speeds are accommodated. Operations may be split and their result represented in a plurality of data streams that are merged into an output data stream being driven at a faster frequency. Furthermore, by using the same edge of multiple phase clocks to sample the plurality of input data streams, the large amount of jitter that would be introduced by sampling the plurality of input data streams with both rising and falling edges of the same clocking signal is reduced. As a consequence, the speed of interconnects may be increase without adversely affecting input/output buffer jitter budgets or the design of internal component complex operations.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
    generating a first signal with signal logic, the first signal having first periodic transitions;
    generating a second signal with the signal logic, the second signal having second periodic transitions with a phase different from the first periodic transitions;
    sampling a first data stream based on a transition of the first signal in a first direction;
    sampling a second data stream based on a transition of the second signal in the first direction; and
    outputting a serialized data stream utilizing NMOS based driver logic, wherein the serialized data stream is based on the sampling of the first and second data streams, wherein the first and the second data streams are sampled using a domino inverter stage, and wherein the NMOS based driver logic includes NMOS differential pre-driver logic to provide the serialized data stream to output driver logic.

2. The method of claim 1, wherein the first and second signals are clocking signals, and wherein the second transitions are 180 degrees out of phase with the first transitions.

3. The method of claim 2, wherein the signal logic comprises a phase locked loop (PLL).

4. The method of claim 1, wherein the domino inverter stage comprises
a first inverter to sample the first data stream based on a transition of the first signal in the first direction;
a second inverter to sample the second data stream based on a transition of the second signal in the first direction;
a third inverter to sample an inverse of the first data stream based on a transition of the first signal in the first direction;
a fourth inverter to sample an inverse of the second data stream based on a transition of the second signal in the first direction.

5. The method of claim 4, wherein the first direction is a rising edge direction.

6. The method of claim 4, wherein the first direction is a falling edge direction.

7. The method of claim 1, wherein the signal logic is to generate the first signal and the second signal with intentional skew to ensure duty cycles to prevent overlap of sampling the first data stream based on the transition of the first signal in the first direction and sampling a second data stream based on a transition of the second signal in the first direction.

8. The method of claim 7, wherein the first direction is a rising edge direction, and wherein the signal logic includes stronger pull-down logic, such that the intentional skew includes a faster falling edge ensure high logic levels do not overlap to prevent overlap of sampling the first data stream based on the transition of the first signal in the first direction and sampling a second data stream based on a transition of the second signal in the first direction.

9. The method of claim 1, wherein the serialized data stream comprises
a first unit interval of the serialized data stream at a first logic level based on the sample of the first data stream; and
a second unit interval of the serialized data stream at a second logic level based on the sample of the second data stream.

10. The method of claim 1, wherein serialized data stream transitions at twice the frequency of the first and second data streams.

11. An apparatus comprising:
clocking logic to generate a first clock signal and a second clock signal having a phase different from the first clock signal; and
enable logic to provide a plurality of enable signals to NMOS differential driver logic based on a first data stream, a second data stream, an inverse of the first data stream, an inverse of the second data stream, the first clock signal, and the second clock signal, wherein the NMOS differential driver logic is to drive a differential output data stream at a frequency faster than the first and the second data streams based on the plurality of enable signals.

12. The apparatus of claim 11, further comprising sampling logic to sample the first data stream and the inverse of the first data stream upon a transition of the first clock signal in a first direction, and sample the second data stream and the inverse of the second data stream upon a transition of the second clock signal in the first direction.

13. The apparatus of claim 12, wherein the sampling logic to sample the first data stream and the inverse of the first data stream comprises:
a first inverter to invert the first data stream upon a transition of the first clock signal in the first direction;
a first NAND gate to take the invert of the first data stream as an input and output a first enable signal to the NMOS differential driver logic.

14. The apparatus of claim 13, wherein the logic to sample the first data stream and the inverse of the first data stream further comprises:
a second inverter to take the inverse of the first data stream and invert it upon a transition of the first clock signal in the first direction;
a second NAND gate to take the invert of the inverse of the first data stream as an input and output a second enable to the NMOS differential driver logic.

15. The apparatus of claim 14, wherein the sampling logic to sample the second data stream and the inverse of the second data stream upon a transition of the second clock signal in the first direction comprises
a third inverter to invert the second data stream upon a transition of the second clock signal in the first direction;
the first NAND gate to farther take the invert of the second data stream as an input and to output the first enable signal to the output logic;
a fourth inverter to take the inverse of the second data stream and invert it upon a transition of the second clock signal in the first direction;
the second NAND gate to further take the invert of the inverse of the second data stream as an input and output the second enable signal to the output logic.

16. The apparatus of claim 15, wherein the differential output data stream includes a first positive output and a second differential output.

17. The apparatus of claim 16, wherein the first enable signal is output to pull-up logic of the first positive output and pull-down logic of the second differential output, and wherein the second enable signal is output to pull-down logic of the first positive output and pull-up logic of the second differential output.

18. An apparatus comprising:
locked loop logic to generate a first clock signal and a second clock signal, the
second clock signal being complementary in phase to the first clock signal;
domino inverter logic to
sample a first data stream based on a transition of the first clock in a first direction, and
sample a second data stream based on a transition of the second clock in the first direction;
logic to output a differential data stream including a first period, the first period having
a first unit interval with a first logic value based on the sample of the first data stream, and
a second unit interval with a second logic value based on the sample of the second data stream.

19. The apparatus of claim 18, wherein the lock loop logic includes a phase-locked loop.

20. The apparatus of claim 18, wherein the domino inverter logic comprises
a first inverter to invert the first data stream upon the transition of the first clock in a first direction;

a second inverter to invert the second data stream upon the transition of the second clock in the second direction;
a third inverter to invert an inverse of the first data stream upon the transition of the first clock in the first direction; and
a fourth inverter to invert an inverse of the second data stream upon the transition of the second clock in the second direction.

21. The apparatus of claim 18 further comprising
a first NAND gate to take the invert of the first data stream as an input, to take the invert of the second data stream as an input, and to output a first enable signal; and
a second NAND gate to take the invert of the inverse of the first data stream as an input, to take the invert of the inverse of the second data stream as an input, and output a second enable signal.

22. The apparatus of claim 21, wherein the logic to output a differential data stream includes differential drive logic having a first differential output and a second differential output.

23. The apparatus of claim 22, wherein the first enable signal is provided to pull-up logic of the first differential output and pull-down logic of the second differential output, and wherein the second enable signal is provided to pull-down logic of the first differential output and to pull-up logic of the second differential output.

24. A system comprising:
a first component including
a phase locked loop (PLL) to generate a first clock signal and a second clock signal, the second clock signal being out of phase with the first clock signal;
domino inverter logic to sample a first logic level of a first data stream upon a transition of the first clock signal in a first direction and to sample a second logic level of a second data stream upon a transition of the second clock signal in the first direction;
logic to drive a differential output data stream at a frequency faster than the first and second data stream, the differential output data stream based on the first logic level and the second logic level; and
a differential interconnect to couple the first component to a second component, the second component including an I/O buffer to receive the output data stream.

25. The system of claim 24, wherein the first and second component are each selected from a group consisting of a processor, a microprocessor, a controller hub, a memory controller hub, a interconnect controller hub, a video controller, a memory device, an interconnect device, a network adapter, and an audio controller.

26. The system of claim 25, wherein the differential interconnect is selected from a group consisting of a common serial interconnect (CSI), a front-side bus (FSB), a peripheral bus, a video interconnect, and a controller hub link interconnect.

27. The system of claim 24, wherein the second clock signal is 180 degrees out of phase with the first clock signal.

28. The system of claim 24, wherein PLL is to generate the first clock signal and the second clock signal with intentional skew of transitions in a second direction to prevent overlap of sampling the first data stream based on the transition of the first signal in the first direction and sampling a second data stream based on a transition of the second signal in the first direction.

29. The system of claim 24, wherein the logic to drive a differential output data stream comprises an NMOS differential driver.

30. The system of claim 24, wherein the output data stream is driven at twice the frequency of the first and second data stream.

* * * * *

UNITED STATES PATENT AND TRADEMARK OFFICE
CERTIFICATE OF CORRECTION

PATENT NO. : 7,577,861 B2
APPLICATION NO. : 11/322681
DATED : August 18, 2009
INVENTOR(S) : Levin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 612 days.

Signed and Sealed this

Seventh Day of September, 2010

David J. Kappos
*Director of the United States Patent and Trademark Office*